United States Patent Office 3,413,152
Patented Nov. 26, 1968

3,413,152
METHOD OF MAKING CARBONACEOUS
FUEL CELL ELECTRODE
Hillis O. Folkins and Oral L. Beber, Crystal Lake, Ill., assignors to Union Oil Company of California, Los Angeles, Calif., a corporation of California
No Drawing. Filed July 30, 1965, Ser. No. 476,173
11 Claims. (Cl. 136—86)

This invention relates to fuel cell electrodes and a method of preparing fuel cell electrodes which not only have high electrochemical activity but also have sustained energy outputs. More specifically, the invention is directed to the use of novel binding materials for fuel cell electrodes which materials contribute to increased energy output of the electrodes and which increased efficiency has not heretofore been attained through the use of conventional binding materials in the fabrication of fuel cell electrodes.

The prior art is well aware of the myriad of variables associated with the electrochemical process, and while many of the complexities of the reaction have been reduced to general understanding, the role that various components of the fuel cell electrode play remains ambiguous and eludes the best efforts of highly skilled scientists working in this field.

In general, the fabrication of an electrode merely involves the formation of rigid carbon supports or matrices for utilization as either a catalytic fuel electrode or oxygen electrode of a fuel cell. In other instances, substrates of electrically conductive porous metals or metal screens serve as the supporting base for a catalytic carbonaceous layer superimposed on the substrate. Likewise, a laminated all carbon electrode may be devised wherein the carbon matrix supports a catalytic layer is in the case of a metal substrate. In each instance it is known to employ nonporous calcined carbon, porous carbon or graphite, or even combinations of these materials as the starting constituents for the electrode matrix or catalytic layer and to mold or otherwise form a mix of said constituents into a rigid mass having an acquired structural porosity. The catalytic material per se may be mulled into the mix by physical means or may be incorporated in the electrode by various techniques. One technique involves mulling in a salt of an electrochemical catalyst metal and thereafter reducing the salt to the elemental metal. An alternative technique involves the steps of: absorbing a catalytic noble metal compound on activated carbon powder of a fine mesh; forming a suspension of the noble-metal-impregnated-carbon in a suitable liquid carrier; and introducing the suspension into a porous electrode matrix or support of substantially coarser mesh than the carbon powder, followed by drying at substantially ambient temperatures. In some instances the layers of carbon matrix and catalytic layer which is disposed on the carbon matrix or metal substrate are individually formed as a raw or green mix by combining the carbonaceous material in finely divided form with a suitable liquid binder. Portions of the various raw or green mixes are then placed as shallow layers in compression molds and compressed at relatively high pressures such as in the range of about 1500–15,000 p.s.i. to form thin plates or discs. In other instances single layer catalytic-impregnated or coated carbon electrodes are desired. Where a metal substrate is contemplated, the substrate acts as one side of the mold. The liquid binders heretofore utilized to impart cohesiveness and mechanical rigidity to the fabricated electrodes have been heavy residual hydrocarbon oils, such as pitch, and in some instances coal tar derivatives have been utilized.

It has now been unexpectedly discovered that a superior fuel cell electrode results when a heavy syrup or sugar solution is used as the binding material. The terms syrup and sugar solutions are intended herein and in the appended claims to mean fluids in which are contained organic compounds of the formulae: $C_nH_{2n}O_n$;

$$C_nH_{2n-2}O_{n-1}$$

and derivatives thereof containing substituents inert to or incapable of inhibiting the electrochemical activity of the catalytic material employed in the electrode, and wherein $n$ is an integer from about 5 to 18 inclusive. By inert or nonaffecting substituents is intended all of those substituents which are known not to "poison" catalytic materials. It is well known that a substituent such as sulfur affects the catalytic activity of noble metal catalysts such as palladium and platinum. Obviously it is imperative, in order to obtain as high electrochemical activity as possible, to refrain from using any of the compounds of the above generic formulae which break down during curing of the electrode to deposit poisons such as sulfur, ammonia compounds, etc., which may adsorb on the catalyst surface.

The type of organic compounds contemplated for use as the binding material include monosaccharides or simple sugars such as glucose and fructose and sugar-like polysaccharides such as sucrose, maltose and lactose. Of the monosaccharides may be mentioned the exemplary classes such as the ketoses and aldoses, including trioses, tetraoses, pentoses and hexoses. Nonlimiting examples of aldoses include glucose, mannose, threose, erythrose, xylose, lyxose, arabinose, ribose, galactose, allose and altrose etc. Nonlimiting examples of the ketoses include fructose, sorbose, tagatose and osone, etc. Polysaccharides such as sucrose, turanose, maltose, gentiobiose, cellobiose, trehalose, lactose, melibiose, and raffinose are additional nonlimiting examples of suitable binding materials. It has been found, for reasons of economy and practical utility, that a simple corn syrup, such as those that are readily available on the commercial market, are suitable in the practice of this invention. Corn syrup is a mixture of dextrose, maltose and dextrins in water, wherein the water comprises about 20% of the mixture.

The foregoing compounds may be utilized in forming a binder solution or syrup with an aqueous medium, such as water. Ordinarily, suitable solutions for formulating the binding liquid will comprise about 10 to 90 wt. percent of any one of the foregoing compounds or mixtures thereof. A preferred range of from about 30 to 80 wt. percent will generally be found to produce a low fluidity binder liquid suitable for the intended purposes.

In accordance with this invention, a porous carbon electrode or catalytic layer suitable for application on a carbon matrix or metal substrate is fabricated using sugar solutions as the binding material. If an all carbon electrode is desired, a base layer or matrix is first prepared with, for example, 100–150 mesh carbon with about 15% by weight of corn syrup. Generally, an amount of binder between about 10 to 25 wt. percent of the carbonaceous material utilized will suffice to permit the formation of a pliable carbon mass of homogeneous consistency. The procedure simply consists of adding the corn syrup to the finely divided carbon and thoroughly mixing the resulting mixture until a homogeneous mass results. Thereafter the resulting pliable mixture may be fashioned into suitable form and heated preferably in an inert or non-oxidizing gas atmosphere in order to set or carbonize the sugar solution of the mass. Alternatively, a catalytic layer, as hereinafter described, may be superimposed on the matrix prior to the heat or carbonizing treatment. The heat or carbonizing treatment may be effectively carried out at temperatures sufficiently high to carbonize the sugar components of the solution. The catalytic layer which may be superimposed on a matrix (thereby forming a laminate electrode), or on one face of a metallic substrate, will generally comprise a finer carbonaceous material of, for example, 150–200 mesh carbon which has been worked up to produce a homogeneous pliable mass suitable for disposition on a carbon matrix or metallic substrate. Here, also, the corn syrup binder will comprise about 10 to 25 wt. percent of the carbonaceous material. A catalytic material may be and preferably is, mulled into this layer during the mixing procedure and ordinarily the catalytic material will generally be present in an amount of about 2–150 mg./cm.$^2$ of the finished electrode body. Once the catalytic layer is superimposed on the matrix or substrate, the thus formed mass may be pressed or molded to form a coherent electrode body which is then subjected to a heat treatment at sufficiently high temperature to set or otherwise carbonize the sugar compounds. After the final carbonizing treatment, it will be found that a coherent unitary electrode body results of sound mechanical stability. As heretofore mentioned, the catalytic material need not be mulled into the catalytic layer but may be disposed in the electrode body by impregnation methods.

While any of the heretofore disclosed carbonaceous materials may be used in conjunction with this invention, it is preferred that a calcined petroleum-derived carbon be utilized. Calcined carbon is obtained from the calcination of petroleum coke at temperatures of about 1700° F. and higher and is generally employed in this application as a finely dispersed material of 60–400 mesh. This material may be used as either the matrix or catalytic layer. Further dissertation regarding surface area of coke particles and methods of deriving carbonaceous material are clearly outside the scope of the hereindisclosed invention, and hence will not be discussed.

The catalytic material employed in the fabrication of the fuel cell electrodes of this invention may be any of those heretofore successfully demonstrated in the art to be adaptable and suitable for the catalysis of the electrochemical process. Thus, the catalyst may be a compound or material suitable for use as an anode or cathode in a fuel cell and may comprise such metals as those of Groups IV, V–B, VI–B, and VIII of the Periodic Table, mixtures of such elements, and inorganic compounds containing at least one of such elements and oxygen. Of these, noble metals such as palladium, ruthenium, rhodium and platinum are preferred.

No novelty is claimed as to the specific types of substrates or electrically conductive supports utilized in conjunction with a carbonaceous catalytic layer, and those substrates of wire mesh configuration having 20–400 mesh may be fabricated of such metals as, for example, stainless steel, nickel, tantalum, palladium, platinum, titanium, silver, gold and niobium. The substrate need not necessarily be in the form of a wire mesh, but may be of fibrous metal mat having a porous or expanded structure. The heat treatment necessary to form a coherent electrode body, in the cases of either the all carbon electrode or the catalytic layer supported on a metallic substrate electrode, of sufficient mechanical strength will normally comprise subjecting the green electrode, matrix and/or catalytic layer and substrate-catalyst layer to a temperature sufficient to carbonize the sugar binder. Ordinarily, temperatures of about 450° to 800° F. will suffice with a preferred temperature of about 600° F. The time of heat treatment will generally depend on the size of the electrode being fabricated and on the ratios of the various constituents. However, heat treating periods of about 0.5 to 8 hours will generally be sufficient to set or carbonize the sugar solution binding materials hereindisclosed at the hereinbefore recited temperature ranges in order to produce a mechanically sound electrode structure.

Other prior art techniques may also be employed in conjunction with the disclosed method of manufacturing fuel cell electrodes. For instance, hydrophilic materials such as finely shredded asbestos fibers may also be incorporated in the matrix or catalytic layer or both, it being only necessary to utilize the sugar solution as the binding material in amounts sufficient to obtain a readily pliable homogeneous mass. In addition, the electrodes may be wetproofed in manners readily known in the prior art with halocarbon polymers such as polytetrafluoroethylene, polytrifluoroethylene, polyvinylchloride, polyvinylidene fluoride, polytrifluorochloroethylene and copolymers of different fluorocarbon monomers, e.g. copolymers of tetrafluoroethylene and hexafluoropropylene. A satisfactory wetproofing agent is a tetrafluoroethylene fluorocarbon resin marketed commercially by E. I. du Pont de Nemours & Co., Inc. under the trademark "Teflon." When a wetproofing agent is utilized, it is preferred to add the wetproofing agent to the carbonaceous mass prior to the carbonizing treatment. In other instances where the particular wetproofing agent will be adversely affected by high temperatures, the wetproofing material may be applied to the fabricated electrode after the carbonizing treatment as by coating.

In one preferred mode of carrying out the invention, a 2-layer electrode was prepared. The procedure comprised mixing 1.0 gm. of calcined petroleum carbon of 100–150 mesh with 0.15 gm. of "Karo Syrup" (a commercially available corn syrup consisting of dextrose, maltose and dextrins with about 20% water) at a temperature of about 75° F. The resultant pliable mass, destined to be the matrix of the fabricated electrode, was then placed in a mold partially filling same to a height of about $\frac{1}{16}$ inch. To the matrix was applied a catalytic layer comprising a mixture of 0.5 gm. 150–200 mesh calcined petroleum carbon, 0.5 gm. platinum black, 0.15 gm. "Karo Syrup" and 0.25 gm. "Teflon 30 B," a commercially available tetrafluoroethylene fluorocarbon resin emulsion containing 0.15 gm. of "Teflon" solids. The thus formed laminate was pressed at 15,000 p.s.i. at a temperature of 75° F. The molded electrode was then calcined in a nitrogen atmosphere for a period of approximately 8 hours at 600° F. The electrode thus formed will hereinafter be designated as electrode A.

Another electrode (B) was fabricated following exactly the same procedure as that used in forming electrode A, with the exception that the finished electrode was calcined in a nitrogen atmosphere at a temperature of 1700° F. for a period of one hour.

In order to compare electrodes A and B, exemplary of the hereindisclosed invention, two electrodes C and D were fabricated using the same general procedure used in preparing electrodes A and B with two exceptions. Firstly, 0.4 gm. of petroleum pitch was used in preparing electrode C and 0.33 gm. of petroleum pitch was utilized in working up the carbonaceous material for electrode D. Mixing was carried out at 300° F. It will be noted that considerably more petroleum pitch binder was necessitated because of the lack of fluidity of the petroleum pitch thereby making it necessary to use more petroleum pitch binder in order to obtain a pliable homogeneous mass. Secondly, the wetproofing material ("Teflon") was not mixed in with the carbonaceous material because the petroleum pitch requires higher temperaures to carbonize or set the petroleum pitch binder, and these high temperatures would have had an adverse effect on the wetproofing material. Both electrodes C and D were calcined in a nitrogen atmosphere at a temperature of 1700° F. for a period of 2 hours; thereafter the calcined electrodes were coated with "Teflon 30 B" emulsion and then subjected to a curing treatment in a nitrogen atmosphere at a temperature of 600° F. for a period of 2 hours in order to cure the tetrafluoroethylene fluorocarbon resin. All of these electrodes were then tested as a half cell for the oxidation of hydrogen in a one molar solution of sulfuric acid at room temperature. Using a calomel reference electrode the thus fabricated electrodes were tested, and the results of those tests are indicated in the following table.

TABLE I

| | Voltage versus saturated calomel electrode | | | |
|---|---|---|---|---|
| | Electrode A | Electrode B | Electrode C | Electrode D |
| Open circuit voltage | −0.24 | −0.24 | −0.235 | −0.235 |
| Activity/milliamp/cm.$^2$: | | | | |
| 5 | | −0.24 | −0.22 | −0.20 | −0.220 |
| 10 | −0.238 | −0.193 | −0.15 | −0.140 |
| 25 | −0.230 | −0.115 | +0.03 | +0.020 |
| 50 | −0.215 | +0.015 | | |
| 100 | −0.190 | | | |
| 200 | −0.140 | | | |
| 300 | −0.085 | | | |
| 400 | −0.035 | | | |
| 500 | +0.005 | | | |

From an inspection of the data of Table I for electrode A, an electrode fabricated in accordance with this invention, it is readily apparent that its activity is much greater than electrodes C and D which represent electrode made in the conventional manner with petroleum pitch binders. As shown in Table I, electrode A effected a current density of 500 ma./cm.$^2$ of electrode surface at +0.005 volt versus Saturated Calomel electrode (a polarization of only 0.245 volt from the open circuit voltage reading). Electrodes C and D, however, polarized to a greater degree than this at a current density of only 25 ma./cm.$^2$. Thus, electrode A clearly indicates high peak efficiencies of the electrodes fabricated in accordance with this invention. It is readily apparent from comparing the results of electrode A with those of electrode B that, when using the sugar binder solution of this invention, calcining or carbonizing temperatures should not be extremely high so as not to be detrimental to the overall efficency of the fuel cell electrode. However, even though electrode B was subjected to extremely high temperatures, the activity of the electrode was still greater than those of electrodes C and D.

As a further example of our invention an electrode was prepared as follows: 0.25 g. of finer than 200 mesh petroleum carbon and 0.05 g. of platinum black were thoroughly mixed. To this mix was added 3 drops of Teflon 30–B emulsion, 1 drop of corn syrup and 8 drops of water. After thorough mixing, the mixture was spread on a 4TA7-4/0-tantalum screen and pressed between aluminum foil at 6,000 p.s.i. while the mold was heated to 300° F. The electrode was then baked under nitrogen for 8 hours at 600° F. This electrode was tested for hydrogen oxidation in 2 N $H_2SO_4$ electrolyte at room temperature and gave a current density of 200 ma./cm.$^2$ at −0.12 volt versus SCE.

The illustrative examples are given merely as preferred embodiments of the invention; however, the invention is not to be construed as limited thereby. It is possible to produce still other embodiments without departing from the inventive concept hereindescribed and such embodiments are within the ordinary ability of one skilled in the art. For instance, while electrodes have been described which have been fabricated with a wetproofing material, it is readily apparent that the wetproofing material may be disposed on the fabricated electrode body after the green electrode has been subjected to a carbonizing treatment.

The embodiments of the invention in which an exclusive property or privilege is claimed are defined as follows:

1. A method of fabricating and using a fuel cell electrode composed of porous carbonaceous material, binder and metal-containing electrochemical catalytic material comprising intimately contacting a porous carbonaceous material with a binder of sugar solution in an amount sufficient to form a moldable mixture, molding said mixture to form an electrode body, and thereafter subjecting the molded electrode body to a carbonizing treatment to form a coherent, mechanically sound electrode and using said electrode in a fuel cell.

2. The method according to claim 1 which comprises forming said electrode body from at least two layers of the moldable mixture wherein the carbonaceous material in the first layer comprises 50–150 mesh carbon and in the second layer comprises 100–400 mesh carbon.

3. The method of claim 2 in which said catalytic material is incorporated in said second layer of moldable mixture prior to molding.

4. The method according to claim 1 wherein said carbonaceous material is calcined petroleum coke and said sugar solution is a glucose solution.

5. The method according to claim 4 wherein the amount of glucose in said solution is about 30 to 80% and the balance of said solution is water.

6. The method according to claim 5 including the additional step of associating said moldable mixture with an electrically conductive metal substrate.

7. The method according to claim 5 wherein said molded electrode body is thereafter subjected to a heat treatment in an inert atmosphere at a temperature within the range of about 450 to 800° F. for about 0.5 to 8 hours.

8. The method of fabricating a fuel cell electrode consisting essentially of the steps of:
   (a) intimately mixing a finely divided carbonaceous material and a metal-containing electrochemical catalytic material with a sufficient amount of sugar solution and at a temperature suitable to produce a pliable homogeneous mixture, the ratio of said carbonaceous material to said sugar solution being about 10:1 to 4:1;
   (b) applying a layer of the mixture of step (a) to a support from the group consisting of (1) an electrically conductive metal substrate and (2) a pliable homogeneous mixture of a carbonaceous material and a sugar solution and applying pressure to thereby form a laminar structure; and
   (c) subjecting said laminar structure to a sufficient amount of heat for a time period sufficient to substantially carbonize said sugar solution to thereby form a coherent unitary electrode.

9. The method according to claim 8 wherein said sugar solution is a glucose solution, said carbonaceous material is 60 to 400 mesh calcined petroleum coke and said electrochemical catalytic material is platinum black.

10. The method according to claim 9 wherein said laminar structure is heated in a nitrogen atmosphere at a temperature of about 450 to 800° F. for about 0.5 to 8 hours.

11. The method according to claim 10 which additionally includes wetproofing the electrode.

References Cited

UNITED STATES PATENTS

| 2,546,903 | 3/1951 | Morrell | 252—422 |
| 2,900,351 | 8/1959 | Goren et al. | 252—422 |
| 2,641,525 | 6/1953 | Walter et al. | 106—38.23 |
| 3,026,214 | 3/1962 | Boyland et al. | 136—122 X |
| 3,108,057 | 10/1962 | Nelson | 136—122 X |
| 3,113,048 | 12/1963 | Thompson | 136—86 |
| 3,235,473 | 2/1966 | Le Duc | 136—120 |
| 3,252,839 | 5/1966 | Langer et al. | 136—122 |

FOREIGN PATENTS

| 794,989 | 5/1958 | Great Britain. |
| 124,045 | 4/1878 | France. |

ALLEN B. CURTIS, *Primary Examiner.*